3,069,424
THIODISALICYLATE SALT
Charles H. Grogan, Falls Church, Va., and Leonard M. Rice, Baltimore, Md., assignors to The Geschickter Fund for Medical Research, Washington, D.C., a corporation of New York
No Drawing. Filed July 8, 1960, Ser. No. 41,477
1 Claim. (Cl. 260—286)

This application relates to a thiodisalicylate salt and more particularly to the thiodisalicylate salt of 4-dimethylaminoethylamino-6-methoxyquinoline.

It has been established that the base compound 4-dimethylaminoethylamino-6-methoxyquinoline is extremely effective in the treatment of asthmatic and related allergic conditions. A thorough discussion to this effect appears in "Quinoline Therapy in Asthma," C. F. Geschickter, M.D., Southern Medical Journal, 48, 497–509 (1955), and "Therapy of Allergic and Non-Allergic Asthma," C. F. Geschickter, M.D., The Journal-Lancet, Minneapolis, 79, 20–24 (1959).

In view of the useful properties of the base compound as set forth above, it is obviously desirable to compound the base compound into a medicinal formulation which is suitable for practical administration as a drug. Unfortunately, however, many of the salts of the active quinoline base in question do not possess properties which are essential in formulating compositions of the quinoline compound to obtain its full effectiveness for therapeutic use. For example, many of the salts may be prepared in a high state of purity only after the use of laborious techniques, and then only at high expense, and still others are unstable and highly hygroscopic.

It is accordingly a primary object of the present invention to provide a useful salt of 4-dimethylaminoethylamino-6-methoxyquinoline which is non-toxic, which does not impair the utility of the quinoline base in the treatment of asthmatic and related allergic conditions, yet which is stable, non-hygroscopic and which may be formed simply and inexpensively in a high state of purity.

It is another object of the present invention to provide a novel method of treating asthmatic and related allergic conditions by utilization of the thiodisalicylate salt of 4-dimethylaminoethylamino-6-methoxyquinoline.

In accordance with the present invention, applicants have discovered that a truly effective medicinal product useful for the treatment of asthmatic and related allergic conditions is provided by the thiodisalicylate salt of 4-dimethylaminoethylamino-6-methoxyquinoline, having the following formula:

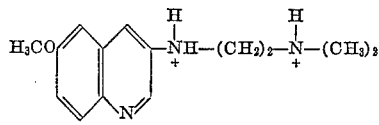

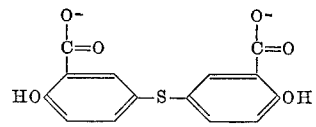

An example of the preparation of this salt follows:

To a solution and suspension of 7.65 grams of finely powdered thiodisalicylic acid in boiling acetone, 6.13 grams of 4-dimethylaminoethylamino-6-methoxyquinoline, also dissolved in acetone, was added. The reaction was extremely rapid. The thiodisalicylic acid dissolved momentarily and, after a short induction period, a white microcrystalline powder was deposited. Upon cooling, better than 95% of the desired salt was recovered as a white, high-melting, non-hygroscopic powder. This powder melts at 249–250° C. and, after recrystallization from alcohol, melts at 250–251° C.

In lieu of acetone, other solvent systems may be used to prepare the salt, i.e., methanol-acetone, methanol-methylene chloride and methanol-methyl ethyl ketone.

For the treatment of an asthmatic condition, the thiodisalicylate salt of the present invention may be orally administered at a dosage of 50 to 100 mg. three times a day or as required, in tablet or capsule form. For children of from 5–12, a 50 mg. dosage twice a day is preferred.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claim are therefore intended to be embraced therein.

What is claimed and desired to be secured by the United States Letters Patent is:

The thiodisalicylate salt of 4-dimethylaminoethylamino-6-methoxyquinoline.

References Cited in the file of this patent

UNITED STATES PATENTS 2,719,848   Geschickter et al. _____ Oct. 4, 1955

OTHER REFERENCES

Geschickter: Quinoline Therapy in Asthma, in Southern Medical Journal, vol. 48, pages 497–509 (1955).

Freedman: Ann. Rheumatic Diseases, vol. 15, pages 251–7 (1956).

Drug Trade News (Manufacturing Section), pages 51 and 60 (September 9, 1957).

Geschickter: Therapy of Allergic and Non-Allergic Asthma, The Journal-Lancet, Minneapolis, pp. 20–24 (1959).